US011290892B2

(12) United States Patent
Furuichi

(10) Patent No.: US 11,290,892 B2
(45) Date of Patent: Mar. 29, 2022

(54) COMMUNICATION CONTROL DEVICE, METHOD AND COMPUTER PROGRAM PRODUCT WITH INTERFERENCE MARGIN ACCEPTANCE CONTROL

(71) Applicant: Sony Corporation, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 55 days.

(21) Appl. No.: 16/964,516

(22) PCT Filed: Dec. 26, 2018

(86) PCT No.: PCT/JP2018/047715
§ 371 (c)(1),
(2) Date: Jul. 23, 2020

(87) PCT Pub. No.: WO2019/150857
PCT Pub. Date: Aug. 8, 2019

(65) Prior Publication Data
US 2021/0037392 A1 Feb. 4, 2021

(30) Foreign Application Priority Data
Jan. 30, 2018 (JP) .............................. JP2018-013671

(51) Int. Cl.
H04W 16/14 (2009.01)
H04W 52/24 (2009.01)
(Continued)

(52) U.S. Cl.
CPC ......... H04W 16/14 (2013.01); H04W 52/243 (2013.01); H04W 52/34 (2013.01); H04W 72/0453 (2013.01); H04W 72/082 (2013.01)

(58) Field of Classification Search
CPC ... H04W 16/14; H04W 52/243; H04W 52/34; H04W 72/0453; H04W 72/082; H04W 72/04; H04W 72/12; H04W 16/28
See application file for complete search history.

(56) References Cited

U.S. PATENT DOCUMENTS

2014/0328423 A1* 11/2014 Agee ..................... H04W 24/02
375/267
2017/0064644 A1* 3/2017 Cariou ................. H04W 72/082
(Continued)

FOREIGN PATENT DOCUMENTS

WO 2015/025605 A1 2/2015

OTHER PUBLICATIONS

International Search Report and Written Opinion dated Mar. 26, 2019 for PCT/JP2018/047715 filed on Dec. 26, 2018, 6 pages including English Translation of the International Search Report.

(Continued)

Primary Examiner — Mewale A Ambaye
(74) Attorney, Agent, or Firm — Xsensus LLP

(57) ABSTRACT

A communication control device includes a processor coupled to the memory, the processor configured to set an acceptable interference amount that is acceptable for a secondary system using a radio wave in a predetermined frequency band allocated to a primary system, with respect to the primary system. The processor accommodates at least a part of a second margin to a different communication control device on the basis of information on a desired interference acceptable amount received from the different communication control device, the second margin being generated at the time of setting the acceptable interference amount and obtained by subtracting a first margin that is (Continued)

allocated to a secondary system managed by the subject device from a total interference margin that is set in the subject device.

12 Claims, 11 Drawing Sheets

(51) Int. Cl.
 *H04W 52/34* (2009.01)
 *H04W 72/04* (2009.01)
 *H04W 72/08* (2009.01)

(56) References Cited

U.S. PATENT DOCUMENTS

2018/0242165 A1* 8/2018 MacMullan ........ H04W 72/048
2021/0127425 A1* 4/2021 Park .................. H04W 74/0833

OTHER PUBLICATIONS

Sawai, R., et al., "Output power management for TVWS network coexistence," doc.:IEEE 802.19-10/160r0, Nov. 8, 2010, 17 pages.

* cited by examiner

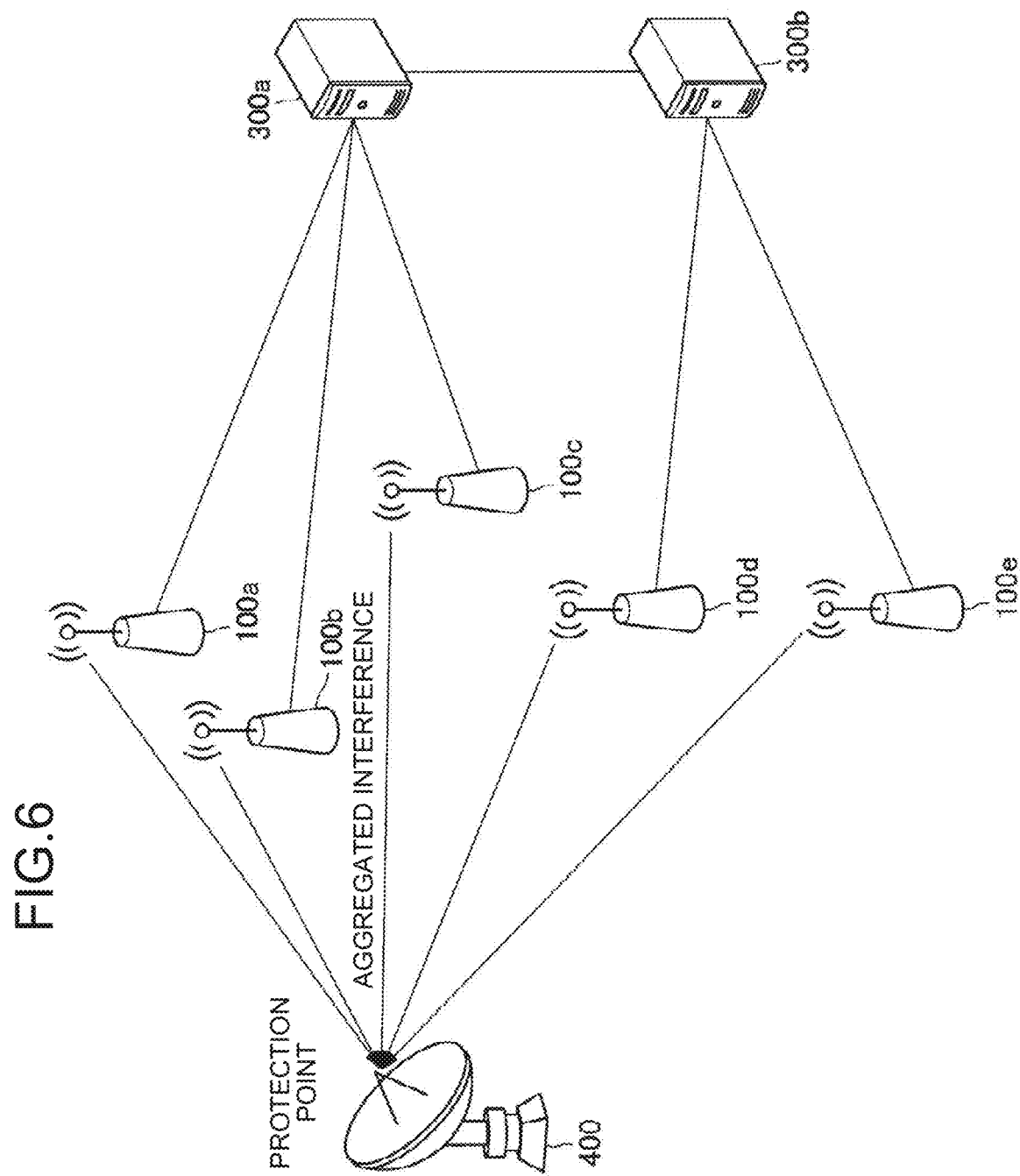

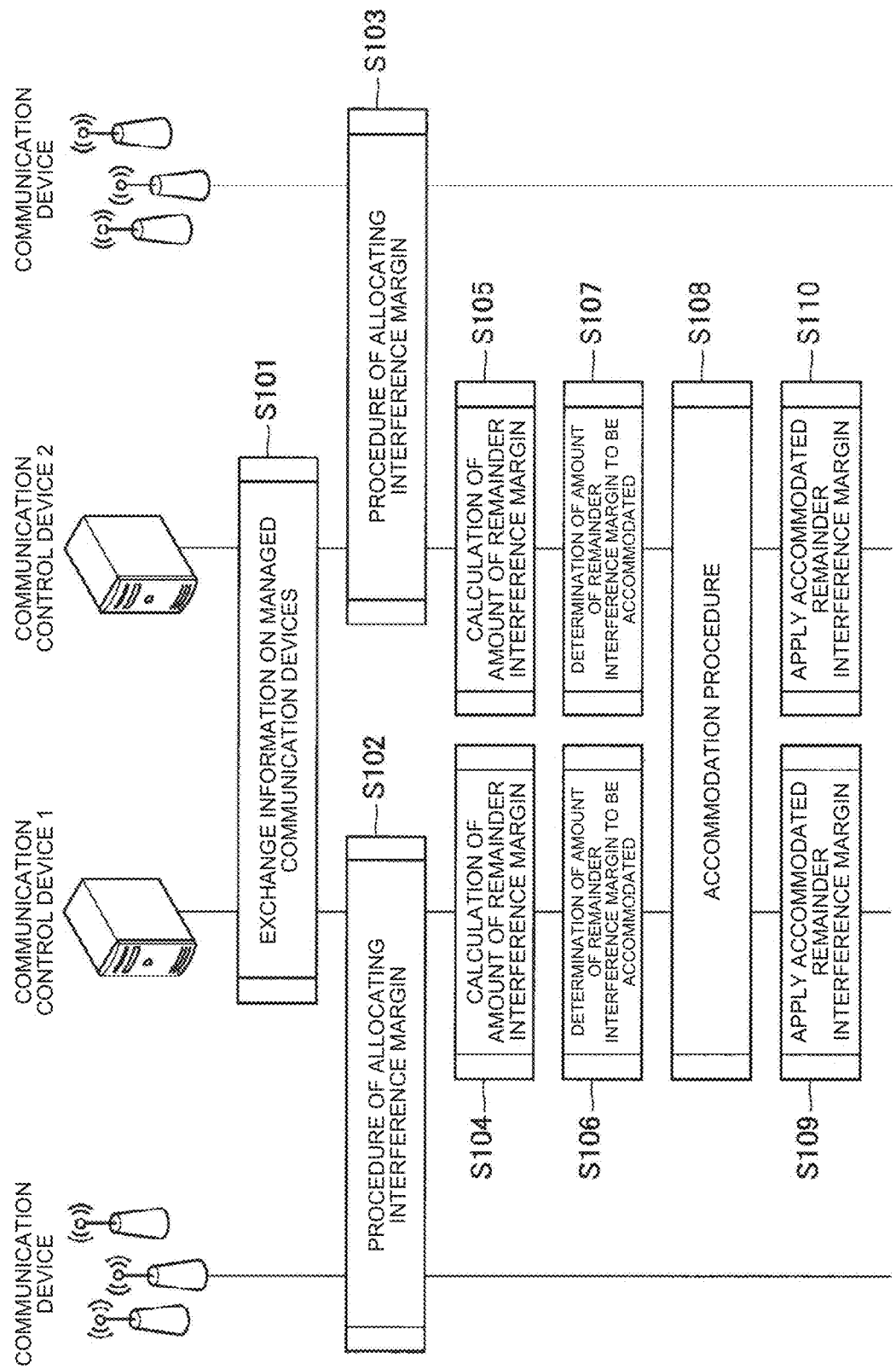

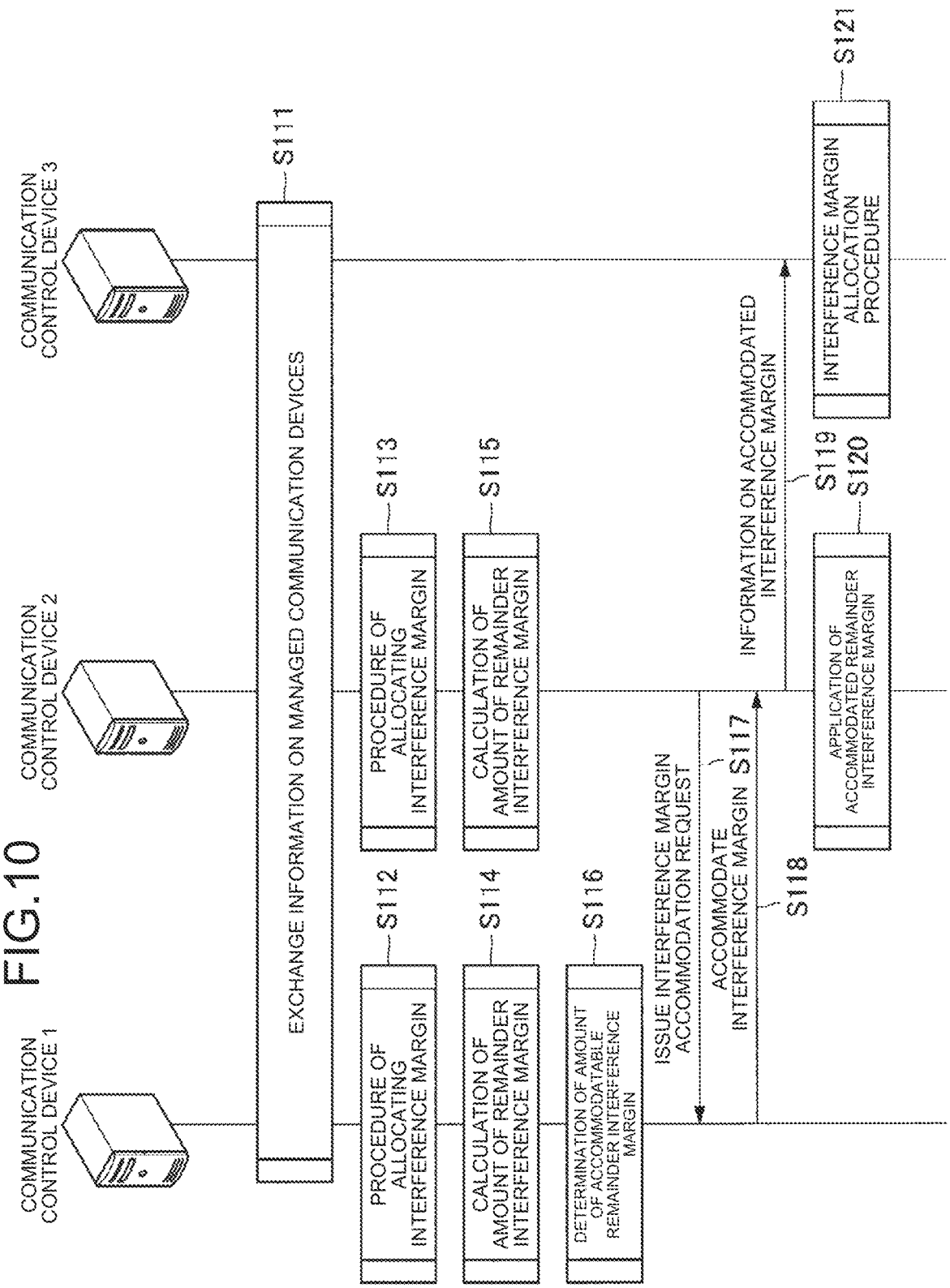

COMMUNICATION CONTROL DEVICE, METHOD AND COMPUTER PROGRAM PRODUCT WITH INTERFERENCE MARGIN ACCEPTANCE CONTROL

CROSS-REFERENCE TO RELATED APPLICATIONS

The present application is based on PCT filing PCT/JP2018/047715, filed Dec. 26, 2018, which claims priority to JP 2018-013671, filed Jan. 30, 2018, the entire contents of each are incorporated herein by reference.

FIELD

The present disclosure relates to a communication control device, a communication control method, and a computer program.

BACKGROUND

In recent radio environments in which various radio systems are mixed and with an increase and diversification in the amount of contents provided via radio, a problem of depletion of radio resources (frequencies) that can be allocated to radio systems is brought to the fore. However, it is known that all of radio bands are used by existing radio systems and it is difficult to allocate new radio resources. Therefore, to manage to secure necessary radio resources, there is an increasing demand for use and utilization (Dynamic Spectrum Access (DSA)) of temporal and spatial radio (White Space) of existing radio systems with utilization of a cognitive radio technology. In recent years, in the United States of America, legislation and standardization of Citizens Broadband Radio Service (CBRS) for utilizing a frequency sharing technology is being accelerated in an effort to open the Federal use band (3.55 to 3.70 GHz), which overlaps with a frequency band that is worldwide recognized as 3GPP band 42, 43, to the public.

In addition, the cognitive radio technology contributes not only to dynamic frequency sharing, but also to improvement of frequency use efficiencies in wireless systems. For example, in ETSI EN 303 387 and IEEE 802.19.1-2014, sharing technologies among radio systems using the White Space are defined. Furthermore, in the Wireless Innovation Forum (WinnForum), standards related to information exchange among a plurality of SASs, where the SASs are frequency management databases called SAS-SAS protocols in CBRS as described in Non Patent Literature 1, are determined.

CITATION LIST

Patent Literature

Non Patent Literature 1: "Signaling Protocols and Procedures for Citizens Broadband Radio Service (CBRS): Spectrum Access System (SAS)-SAS Interface Technical Specification", WINNF-TS-0096, the Internet <URL: https://workspace.winnforum.org/higherlogic/ws/public/docum ent?document_id=4813>

SUMMARY

Technical Problem

In the frequency sharing, it is important to allocate an interference margin to the communication devices in such a manner that aggregation of interferences from a plurality of communication devices does not exceed an interference acceptable value (referred to as the interference margin), and it is important that a frequency management database controls a maximum transmission power (maximum acceptable transmission power) acceptable for the communication devices. However, the communication devices do not always adopt the maximum acceptable transmission power calculated by the frequency management database, and interference margins allocated to the communication devices may remain. In contrast, a frequency management database for which an interference margin is run out and which is not able to allocate the interference margin to all of communication devices may be present.

Therefore, in the present disclosure, a communication control device, a communication control method, and a computer program are proposed that are novel, improved, and capable of appropriately accommodating a remainder interference margin that has not been allocated to a communication device, depending on conditions.

Solution to Problem

According to the present disclosure, a communication control device is provided that includes: a control unit configured to set an acceptable interference amount that is acceptable for a secondary system with respect to a primary system, the secondary system secondary using a radio wave in a predetermined frequency band allocated to the primary system, wherein the control unit accommodates at least a part of a second margin to a different communication control device on the basis of information on a desired interference acceptable amount received from the different communication control device, the second margin being generated at the time of setting the acceptable interference amount and obtained by subtracting a first margin that is allocated to a secondary system managed by the subject device from a total interference margin that is set in the subject device.

Moreover, according to the present disclosure, a communication control method implemented by a processor is provided that includes: setting an acceptable interference amount that is acceptable for a secondary system with respect to a primary system, the secondary system using a radio wave in a predetermined frequency band allocated to the primary system; and accommodating at least a part of a second margin to a different communication control device on the basis of information on a desired interference acceptable amount received from the different communication control device, the second margin being generated at the time of setting the acceptable interference amount and obtained by subtracting a first margin that is allocated to a secondary system managed by the subject device from a total interference margin that is set for the subject device.

Moreover, according to the present disclosure, a computer program is provided that causes a computer to execute: setting an acceptable interference amount that is acceptable for a secondary system with respect to a primary system, the secondary system using a radio wave in a predetermined frequency band allocated to the primary system; and accommodating at least a part of a second margin to a different communication control device on the basis of information on a desired interference acceptable amount received from the different communication control device, the second margin being generated at the time of setting the acceptable interference amount and obtained by subtracting a first margin that is allocated to a secondary system managed by the subject device from a total interference margin that is set for the subject device.

Advantageous Effects of Invention

As described above, according to the present disclosure, it is possible to provide a communication control device, a communication control method, and a computer program that are novel, improved, and capable of appropriately accommodating a remainder interference margin that has not been allocated to a communication device, depending on conditions.

Further, the effects described in this specification are not limitative. That is, with or in the place of the above effects, any of the effects described in this specification or other effects that may be recognized from the present specification may be achieved.

BRIEF DESCRIPTION OF DRAWINGS

FIG. 6 is an explanatory diagram illustrating an interference model that is assumed in the present embodiment.

FIG. 8 is a flow diagram for explaining an example of a remainder interference margin accommodation method according to the embodiment of the present disclosure.

FIG. 10 is a flow diagram illustrating an example of the remainder interference margin accommodation method according to the embodiment of the present disclosure.

DESCRIPTION OF EMBODIMENTS

Preferred embodiments of the present disclosure will be described in detail below with reference to the accompanying drawings. In this specification and the drawings, structural elements that have substantially the same functions and configurations will be denoted by the same reference symbols, and repeated explanation of the structural elements will be omitted.

In addition, hereinafter, explanation will be given in the following order.
1. Embodiment of present disclosure
1.1. Background
1.2. Overview
1.3. Configuration example
2. Conclusion 1. Embodiment of Present Disclosure 1.1. Background Before giving detailed explanation of an embodiment of the present disclosure, a background of the embodiment of the present disclosure will be described.

As described above, to manage to secure necessary radio resources, there is an increasing demand for use and utilization (Dynamic Spectrum Access (DSA)) of temporal and spatial radio (White Space) of existing radio systems with utilization of a cognitive radio technology. In recent years, in the United States of America, legislation and standardization of Citizens Broadband Radio Service (CBRS) for utilizing a frequency sharing technology is being accelerated in an effort to open the Federal use band (3.55 to 3.70 GHz), which overlaps with a frequency band that is worldwide recognized as 3GPP band 42, 43, to the public.

For example, in ETSI EN 303 387 and IEEE 802.19.1-2014, sharing technologies among radio systems using the White Space are defined. Furthermore, in the Wireless Innovation Forum (WinnForum), standards related to information exchange among a plurality of SASs, where the SASs are frequency management databases called SAS-SAS protocols in CBRS, are determined.

In the frequency sharing, it is important to control interferences from secondary systems such that a critical interference is not given to a primary system. More specifically, it is important for the frequency management database to control communication devices such that aggregation of interferences (Interference Aggregation) from a plurality of communication devices does not exceed an acceptable value of the primary system.

For example, ECC Report 186 and CBRS Requirements disclose that an interference acceptable amount of the primary system is referred to as an "interference margin", the interference margin is allocated to a plurality of communication devices, and whether secondary use of a frequency is possible is determined on the basis of the allocated interference margin. It is possible to calculate maximum transmission power (maximum acceptable transmission power) acceptable for the communication devices, by performing a back calculation from a propagation loss, an antenna gain, or the like on the basis of the allocated interference margin (interference acceptable amount), and it is possible to adopt the interference margin to the communication devices.

Figure 1:
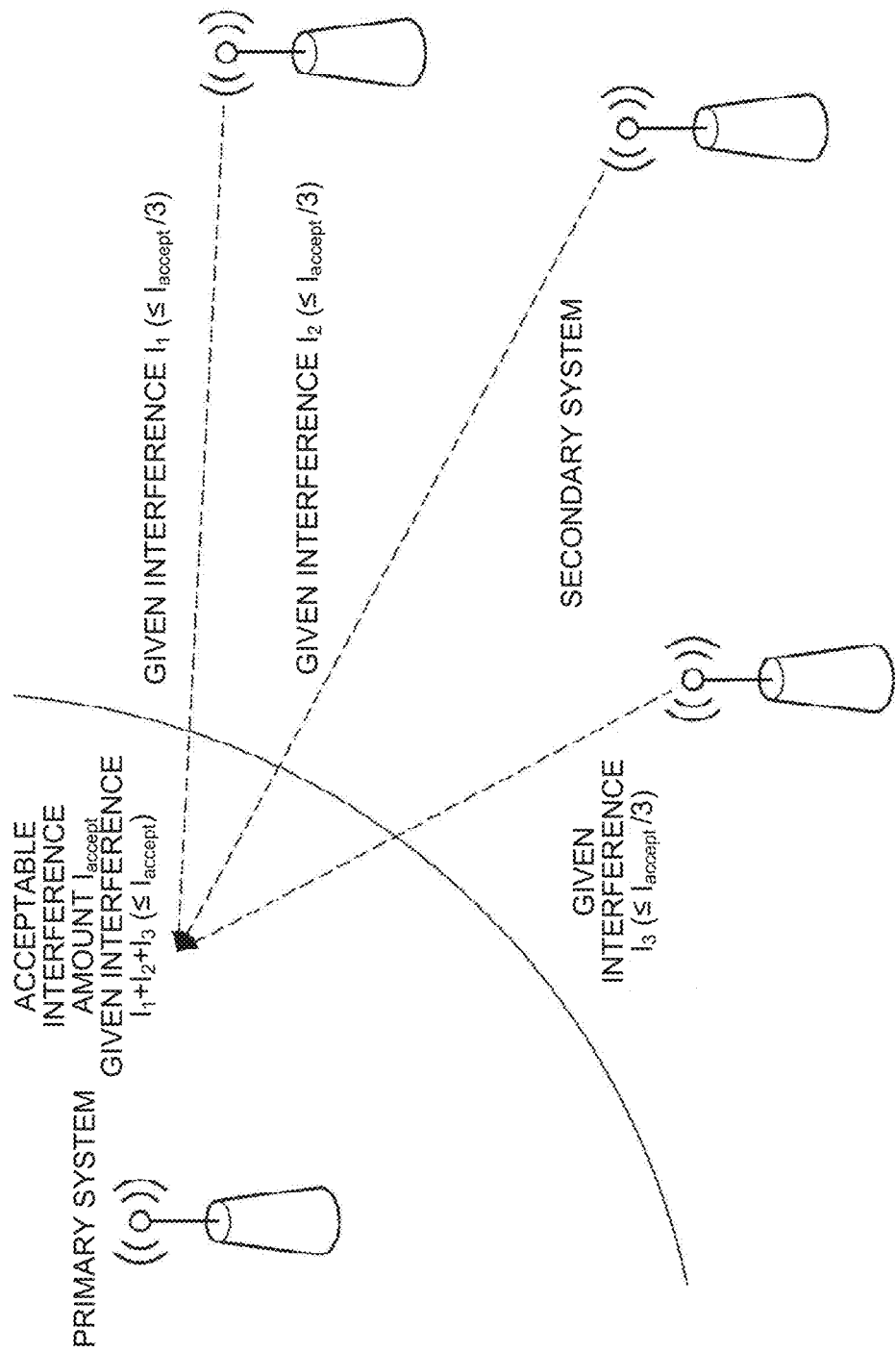
FIG. 1 is an explanatory diagram illustrating an example of allocation of an interference margin to secondary systems.

FIG. 1 is an explanatory diagram illustrating an example of allocation of an interference margin to secondary systems. When an acceptable interference amount is given, the acceptable interference amount is allocated to a plurality of secondary systems, and radio wave transmission is performed on the basis of an allocated acceptable interference amount (that is, a margin for each of devices), so that it is possible to prevent a critical interference from being given to the primary system. In the example illustrated in FIG. 1, if it is assumed that an acceptable interference amount of the primary system is denoted by $I_{accept}$, and interferences given from the secondary systems to the primary system are denoted by $I_1$, $I_2$, and $I_3$, it may be possible to adopt a method of allocating the acceptable interference amount such that a sum of $I_1$, $I_2$, and $I_3$ becomes equal to or smaller than $I_{accept}$. However, this may lead to excessive suppression depending on propagation environments; therefore, in the WinnForum Requirement ("Requirements for Commercial Operation in the U.S. 3550-3700 MHz Citizens Broadband Radio Service Band", WINNF-TS-0112. https://workspace.winnforum.org/higherlogic/ws/public/document?document_id=4743), a method called Iterative Allocation Process (IAP) is needed.

However, the communication devices do not always adopt the maximum acceptable transmission power calculated by the frequency management database. As one example, in some cases, a communication device may refrain from adopting the maximum acceptable transmission power for the reasons as described below. For example, if it is only allowed to perform radio wave transmission with certain transmission power smaller than the maximum acceptable transmission power due to limitations of hardware of a communication device, the communication device may refrain from adopting the maximum acceptable transmission power. Furthermore, for example, while it is possible to adopt the maximum acceptable transmission power due to limitations of hardware of a communication device, if a spectrum mask test (performed by a public institution) for a case in which the calculated maximum acceptable transmission power is adopted is not passed, the communication device may refrain from adopting the maximum acceptable transmission power. Moreover, for example, it may be possible to perform operation with certain transmission power smaller than the maximum acceptable transmission power due to a network planning. Furthermore, for example, there may be a case in which operation using a corresponding channel is avoided because a desired maximum acceptable transmission power value is not obtained. In these cases, the interference margin allocated to the communication device remains. Hereinafter, the remainder interference margin is also referred to as a "remainder interference margin".

In addition, in the example described above, it is assumed that, as one example, the maximum transmission power (maximum acceptable transmission power) is calculated from the interference margin and adopted to the communication devices; however, as another approach, it may be possible to cause a communication device to notify the frequency management database of desired maximum transmission power, and determine whether an estimated value of an interference that may occur due to the desired maximum transmission power meets the interference margin. In this case, if the interference estimated value exceeds the interference margin, it is expected that the frequency management database performs operation of rejecting the desired maximum transmission power for the communication device. Therefore, in this case, the interference margin may remain as the remainder interference margin.

An interference margin allocation method and the like are disclosed in various literatures and a number of discussions have been made; however, how to handle the remainder interference margin that is a remaining interference margin has not been disclosed.

In CBRS, it is requested that a plurality of frequency management databases (Spectrum Access Systems: SASs) manage radio waves in cooperation with one another. In WinnForum SAS-SAS Protocol TS, a message exchange format called Full Activity Dump Message is defined, and it is determined that all pieces of communication device information and the like needed for interference control are periodically exchanged. In a case where the plurality of frequency management databases need to cooperate with one another as described above, if it is possible to accommodate the remainder interference margins depending on conditions, it may be possible to contribute to improvement of frequency use efficiencies.

Therefore, in view of the foregoing situations, disclosures of the present application have earnestly examined a technology capable of appropriately accommodating interference margins allocated to communication devices. As a result, the disclosures of the present application have invented a technology for appropriately accommodating interference margins allocated to communication devices depending on conditions, as will be described below.

1.2. Overview

Figure 2:
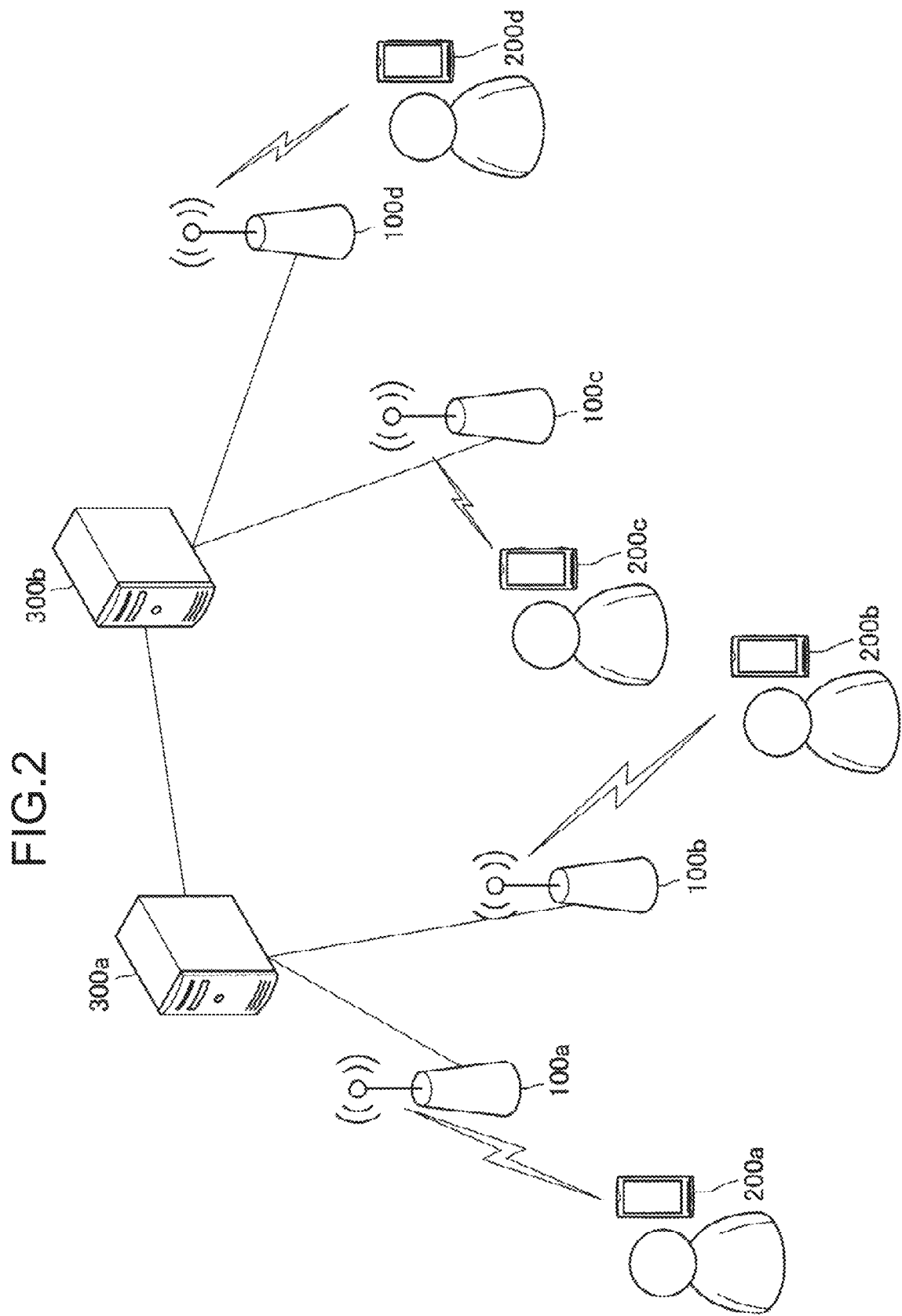
FIG. 2 is an explanatory diagram illustrating a configuration example of a radio system according to an embodiment of the present disclosure.

First, a configuration example of a radio system according to an embodiment of the present disclosure will be described. FIG. 2 is an explanatory diagram illustrating the configuration example of the radio system according to the embodiment of the present disclosure. FIG. 2 illustrates radio devices 100a to 100d, terminals 200a to 200d that perform radio communication with each of the radio devices, and communication control devices 300a and 300b that control base stations are illustrated.

The radio devices 100a to 100d are, in typical cases, devices corresponding to radio base stations, access points, or radio relay stations. The radio devices 100a to 100d may be fixed devices or may be installed in movable bodies, such as vehicles. Radio access technologies used by the radio devices 100a to 100d are not limited to specific technologies. Further, a size of coverage of the radio devices 100a to 100d may be large like macrocells or may be small like picocells. Furthermore, if the radio devices 100a to 100d have beam forming capabilities, it may be possible to form cells or service areas for each of beams. Typically, a single entity or a single person installs and operates a single radio device; however, it is not limited thereto in the present disclosure. The radio devices 100a to 100d may be shared facilities that are used by a plurality of entities or a plurality of persons. In this case, the radio devices 100a to 100d may be installed and operated by third parties that are different from users.

The terminals 200a to 200d are, in typical cases, communication devices, such as smartphones. The terminals need not always be used by human beings, but may be connected to equipment, such as machines in factories and sensors installed in buildings, via networks. Further, as represented by Device to Device (D2D), the terminals 200a to 200d may have relay communication functions. Furthermore, the terminals 200a to 200d may be devices called Customer Premises Equipment (CPE) used for radio backhaul or the like.

Figure 3:
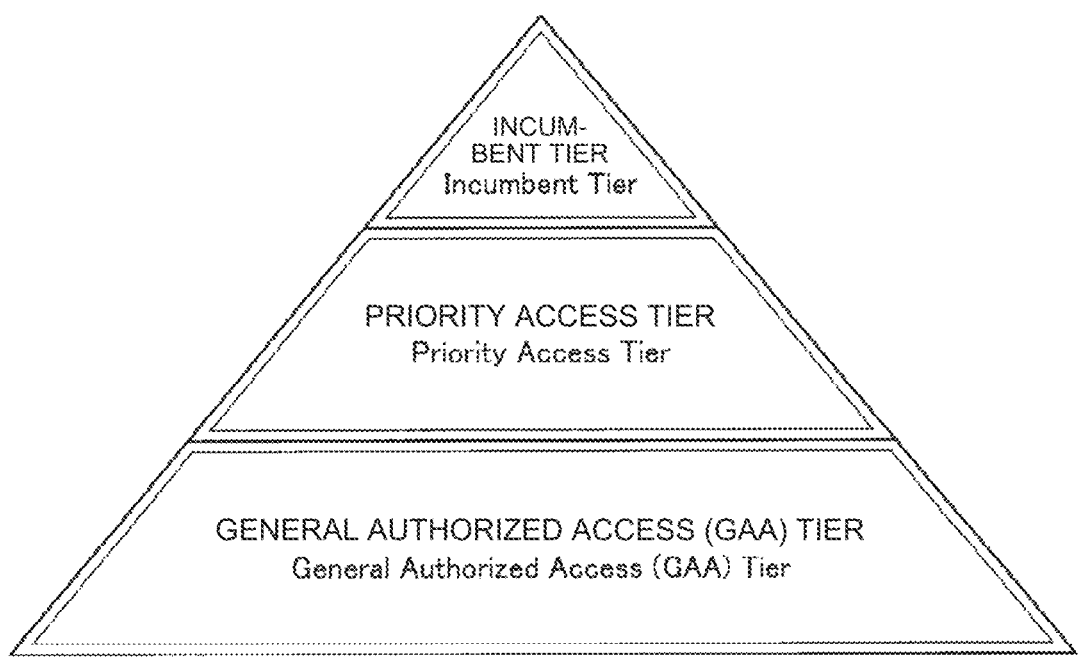
FIG. 3 is an explanatory diagram illustrating a hierarchical structure used in CBRS.

The communication control devices 300a and 300b are devices that determine operation parameters of the radio devices 100a to 100d and give instructions. For example, it may be possible to adopt a network manager that integrally controls radio devices in a network, or a control device, such as a Spectrum Manager or a Coexistence Manager, which controls radio wave interferences among radio devices, as represented by ETSI EN 303 387 and IEEE 802.19.1-2014. In frequency sharing environments, database servers, such as Geolocation database (GLDB) and Spectrum Access System (SAS), may be included in the communication control devices 300a and 300b. A single communication control device may be provided in a single system; however, if the plurality of communication control devices 300a and 300b are present as illustrated in FIG. 3, the communication control devices 300a and 300b exchange information on managing radio devices with each other, and perform necessary frequency allocation and calculations for interference control. Basically, control targets of the communication control devices 300a and 300b are the radio devices 100a to 100d; however, the communication control devices 300a and 300b may control the terminals 200a to 200d that perform radio communication with the radio devices 100a to 100d.

In the present embodiment, explanation will be given based on the assumption that a frequency sharing environment is adopted. As one example, in Citizens Broadband Radio Service (CBRS) legislated by the Federal Communications Commission (FCC) in the United States of America, as illustrated in the following figure, a military radar, a Grandfathered wireless system, or a fixed satellite service (radio wave transmission from Space to Earth) serves as the primary system, and radio systems called Citizens Broadband Radio Service Devices (CBSDs) serve as the secondary systems. Further, priorities are given to the secondary systems, and Priority Access License (PAL) that allows use of a shared band with licenses and General Authorized Access (GAA) that is equivalent to a case in which no license is needed are determined. In the embodiment of the present disclosure, the radio systems are, of course, not limited to this example. It may be possible to adopt other radio systems as the primary system. Further, it may be possible to adopt a frequency sharing environment in a different frequency band. Furthermore, the present disclosure is not limitedly applied to the frequency sharing. The technology of the present disclosure may be applied to a scenario of network coexistence among same or different radio systems that use the same frequency.

Figure 4:
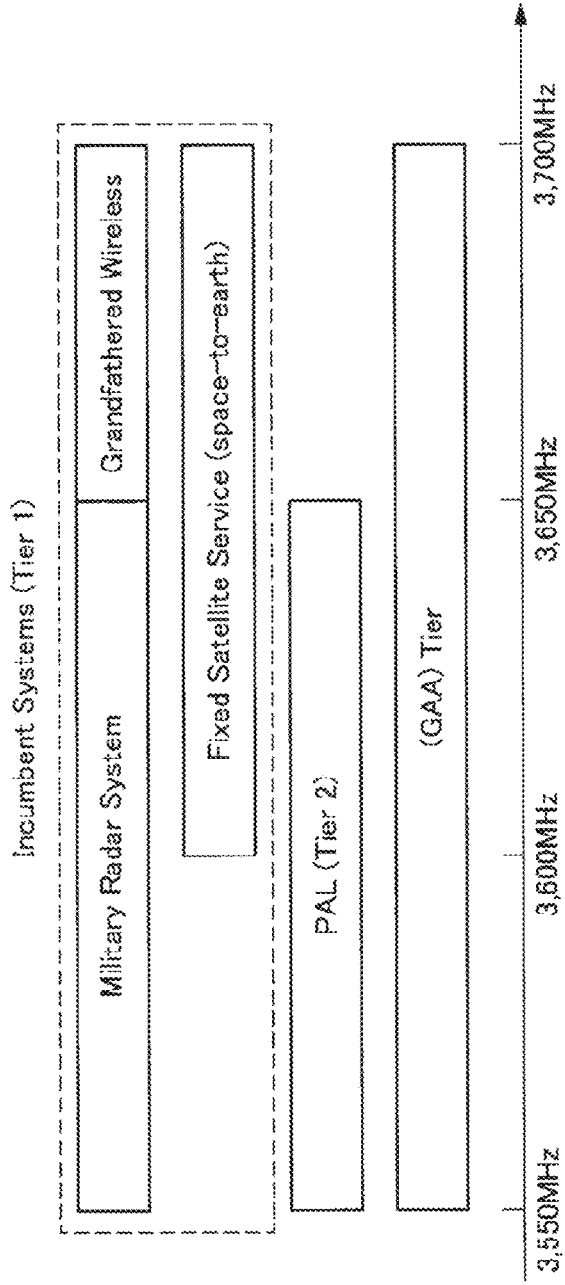
FIG. 4 is an explanatory diagram illustrating a band in CBRS.

FIG. 3 is an explanatory diagram illustrating a hierarchical structure used in CBRS. A priority access tier is present above a general authorized access tier, and an incumbent tier is present above the priority access tier. Further, FIG. 4 is an explanatory diagram illustrating a band in CBRS. In the present embodiment, a case is assumed in which bands of the general authorized access tier, the priority access tier, and the incumbent tier are determined as illustrated in FIG. 4.

Figure 5:
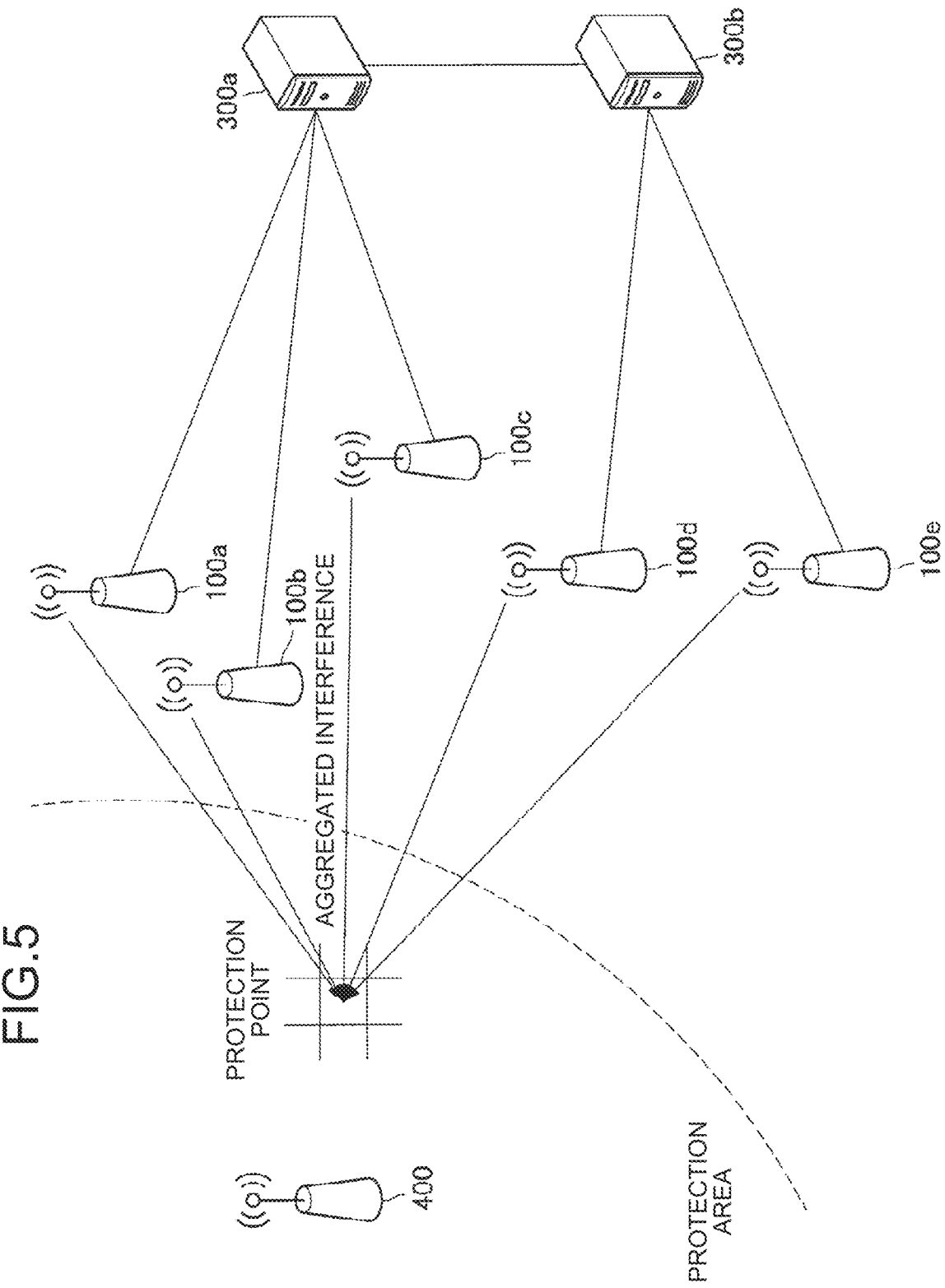
FIG. 5 is an explanatory diagram illustrating an example of an interference model that is assumed in the present embodiment.

Next, examples of an interference model will be described. FIG. 5 and FIG. 6 are explanatory diagrams illustrating examples of the interference model that is assumed in the present embodiment. FIG. 5 is an explanatory diagram illustrating interferences that are given by the radio devices 100a to 100e to a protection point located in a protection area of a primary system 400. In the example illustrated in FIG. 5, an interference model that is applied to a system having a service area for Grandfathered Wireless or the like is illustrated, and amounts of interference at a plurality of protection points set in the protection area are taken into account. In the example illustrated in FIG. 6, an interference model that is applied to a system in which a primary system, such as a satellite earth station, performs only reception, and an amount of an interference at a protection point is taking into account, where the protection point is set at a position of a receiving antenna of the satellite earth station, for example.

Figure 7:
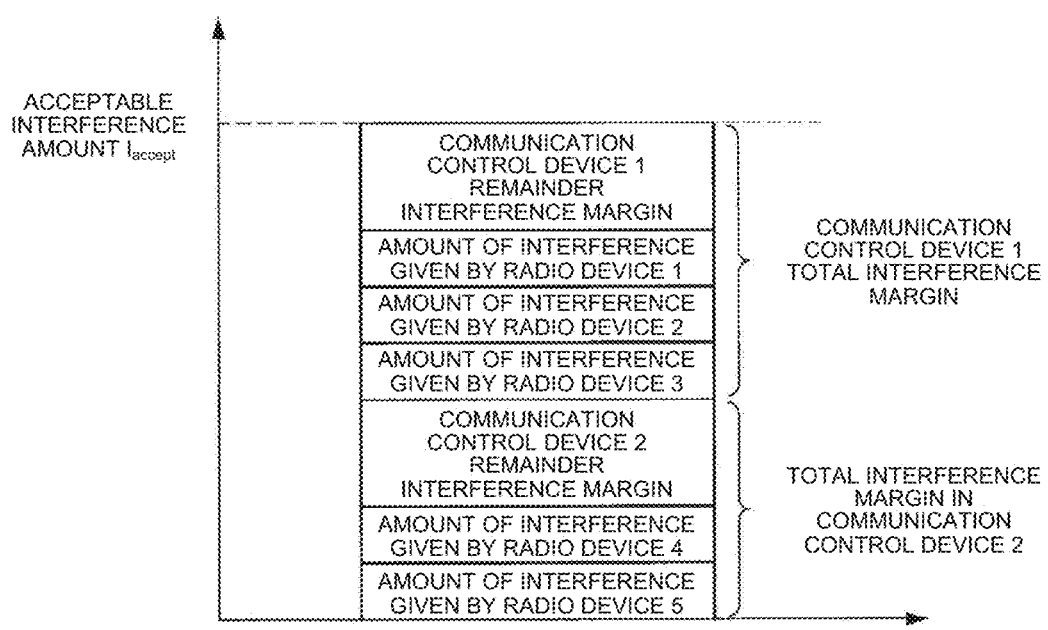
FIG. 7 is an explanatory diagram illustrating a setting example of remainder interference margins.

Next, a model of remainder interference margins will be described. FIG. 7 is an explanatory diagram illustrating a setting example of remainder interference margins. FIG. 7 illustrates an example of a total interference margin that is set for each of the two communication control devices, amounts of interferences given by the radio devices managed by each of the communication control devices, and a remainder interference margin that is obtained by subtracting the amounts of interferences of the radio devices from each of the total interference margins.

An interference margin is allocated to each of the communication control devices, and the communication control devices allocate the allocated interference margins to communication devices managed by the communication control devices and calculate maximum acceptable transmission power based on allocated amounts. However, as illustrated in FIG. 7, an interference margin that is expected to be allocated to a communication device may remain for some reasons, and a remainder interference margin may occur. For example, if it is only allowed to perform radio wave transmission with certain transmission power smaller than the maximum acceptable transmission power due to limitations of hardware of a communication device, the communication device may refrain from adopting the maximum acceptable transmission power. Furthermore, for example, while it is possible to adopt the maximum acceptable transmission power due to limitations of hardware of a communication device, if a spectrum mask test (performed by a public institution) for a case in which the calculated maximum acceptable transmission power is adopted is not passed, the communication device may refrain from adopting the maximum acceptable transmission power. Moreover, for example, it may be possible to perform operation with certain transmission power smaller than the maximum acceptable transmission power due to a network planning. Furthermore, for example, there may be a case in which operation using a corresponding channel is avoided because a desired maximum acceptable transmission power value is not obtained.

Moreover, as described above, if the interference estimated value exceeds the interference margin, it is expected that the frequency management database performs operation of rejecting the desired maximum transmission power for a communication device. Therefore, in this case, the interference margin may remain as the remainder interference margin.

Meanwhile, the interference margin is set for each of interference calculation reference points (protection points) of a protection target radio system and for each of frequency channels. If a plurality of protection target radio systems are present, it is necessary to take into account interference margins corresponding to the plurality of protection target radio systems. In the following explanation, only a single interference calculation reference point (protection point) and a single frequency channel will be focused on, except in special circumstances. Therefore, in the embodiment, the technology is applicable to a case in which a plurality of protection points and a plurality of frequency channels are present.

(Remainder Interference Margin Accommodation Method)

An example of a remainder interference margin accommodation method will be described. FIG. 8 is a flow diagram for explaining an example of the remainder interference margin accommodation method according to the embodiment of the present disclosure. FIG. 8 illustrates the remainder interference margin accommodation method performed by two communication control devices and communication devices managed by each of the communication control devices.

The communication control device exchanges information on the communication devices managed by the subject device with the other communication control device (Step S101). The information to be exchanged includes information on active communication devices and information on inactive communication devices. The active communication devices indicate communication devices for which the communication control device has completed calculations of the maximum acceptable transmission power or for which the communication control device has permitted radio wave transmission. Other communication devices that are only registered in the communication control device are referred to as the inactive communication devices. Information on an active communication device includes, for example, various kinds of ID information on the communication device, information indicating a position of the communication device, information on a frequency to be used, information on transmission power being used in the frequency, information on applicable maximum transmission power, a transmission power class, a device category, or the like. Information on an inactive communication device includes, for example, various kinds of ID information on the communication device, information indicating a position of the communication device, information on applicable maximum transmission power, a transmission power class, a device category, or the like.

Then, each of the communication control devices performs a procedure of allocating the interference margin to the communication devices managed by the subject device (Steps S102 and S103). The communication control devices perform a procedure of allocating the margin to the active communication devices controlled by the subject device by taking into account the communication devices which are controlled by the other communication control device and for which the information has been obtained at Step S101 as described above, calculates the maximum acceptable transmission power, and applies the maximum acceptable transmission power to the communication devices.

Each of the communication control devices, after performing the procedure of allocating the interference margin, calculates an amount of a remainder interference margin (Steps S104 and S105). Then, each of the communication control devices determines an amount of a remainder interference margin to be accommodated, on the basis of the amount of the remainder interference margin and the information on the communication devices acquired from the other communication control device (Steps 3106 and 3107), and performs a procedure of accommodating the interference margin between the communication control devices (Step S108).

Figure 9:
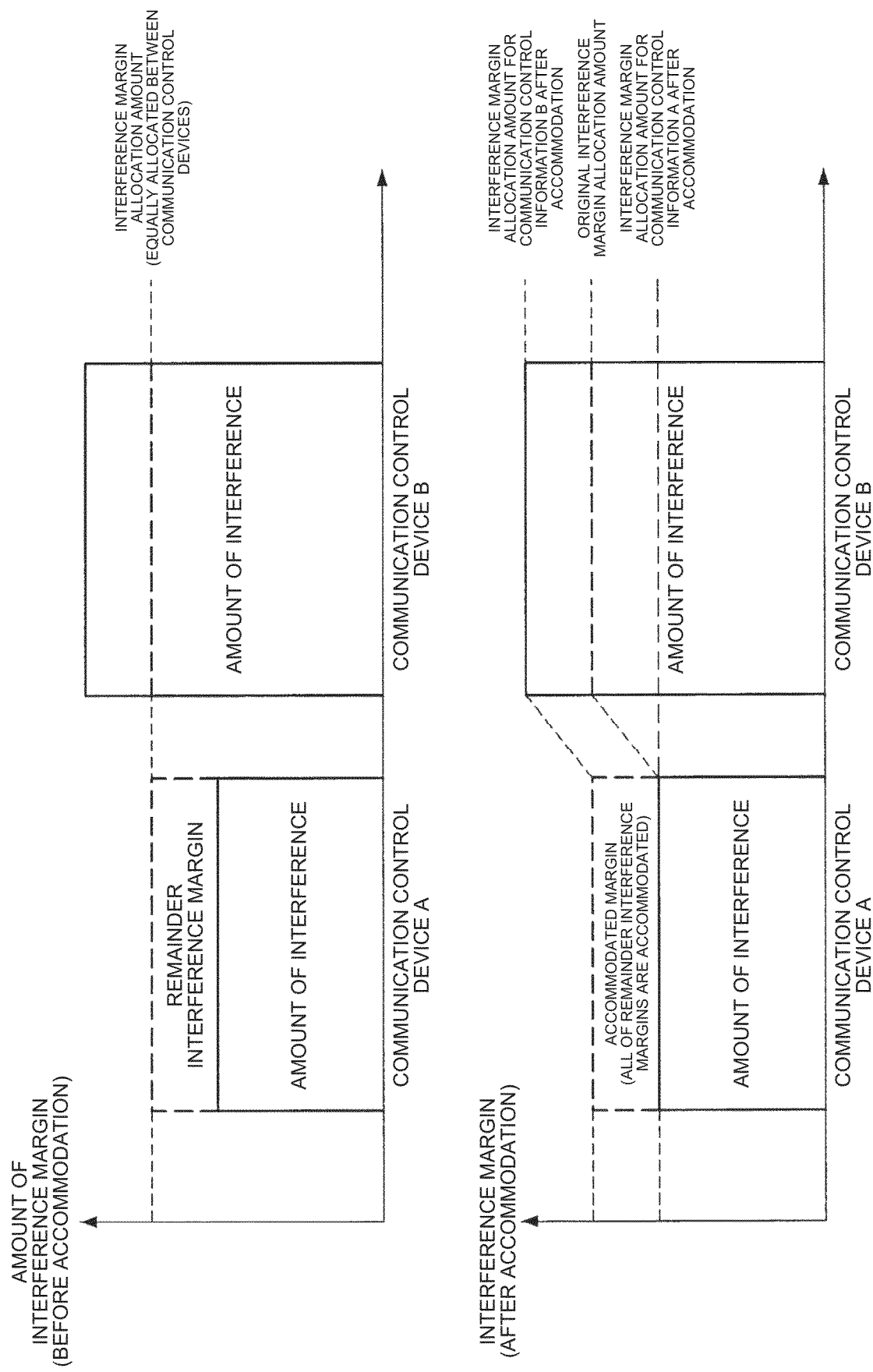
FIG. 9 is an explanatory diagram illustrating an example of a change of an amount of an interference margin before and after accommodation.

FIG. 9 is an explanatory diagram illustrating an example of a change of the amount of the interference margin before and after the accommodation. FIG. 9 illustrates a scenario in which communication devices controlled by a communication control device B may give an interference that exceeds an allocated amount, and therefore, a communication control device A for which an interference margin remains accommodates a remainder interference margin to the communication control device B.

Each of the communication control devices applies a remainder interference margin that has been accommodated to the other communication control device or that has been accommodated from the other communication control device (Steps S109 and S110). In other words, the communication control device that has received the accommodated remainder interference margin takes into account the accommodated remainder interference margin and uses it for a calculation of the maximum acceptable transmission power of the communication devices controlled by the subject device.

To realize the accommodation of the remainder interference margin, mainly two kinds of modes are present. Here, for the sake of simplicity, explanation will be given using names and definitions as described below. The names are, of course, not limited to those as described below.

Active Accommodation

Active accommodation indicates accommodation that is established when the communication control device offers accommodation of the remainder interference margin in the subject device to the other communication control device. This mode may be, for example, an auction system in which the communication control device serves as a seller and the other communication control device serves as a bidder. Further, it may be possible to adopt a mode in which the communication control device offers use of the remainder interference margin in the subject device to the other communication control device.

Passive Accommodation

Passive accommodation indicates accommodation that is established when the communication control device additionally needs an interference margin and requests the other communication control device to accommodate the remainder interference margin in the other communication control device. This mode may be, for example, a mode in which the communication control device that runs out of the interference margin identifies the communication control device for which it is expected that the remainder interference margin has occurred, and issues an accommodation request to the identified communication control device.

In each of the communication control devices, one or both of the modes as described above may be set. Then, set mode information is provided to the other communication control device. The communication control device accommodates the remainder interference margin based on the set mode.

(Method of Determining Amount of Remainder Interference Margin to be Accommodated)

An example of a method of determining an amount of remainder interference margin to be accommodated will be described below.

(First Method)

As a first method, an example will be described in which it is assumed that inactive communication devices controlled by a different communication control device are expected to become active and a total interference margin amount needed by the inactive communication devices are estimated. This method may be applied to the active accommodation.

As for communication devices that are controlled by the different communication control device (assumed as a communication control device 2) that are acquired by information exchange performed by a certain communication control device (assumed as a communication control device 1), the number of active communication devices is denoted by $N_{Active}$, and the number of inactive communication devices is denoted by $N_{Inactive}$. In this case, the communication control device 2 may allocate an interference margin of $M_2/N_{Active}$ to each of the active communication devices. Here, $M_2$ is an interference margin that is allocated from an interference acceptable amount at an arbitrary protection point to the communication control device 2 for the purpose of controlling interferences of the communication devices controlled by the communication control device 2. Similarly, an interference margin allocated to the communication control device 1 is denoted by $M_1$. Here, any method may be applied as the method of allocating $M_1$ and $M_2$.

In this circumstance, in order to eliminate inequalities among the communication devices, it is desirable that the communication control device 2 is able to allocate an interference margin equivalent to the interference margin ($M_2/N_{Active}$) of the active communication devices to $N_{Inactive}$ inactive communication devices that are expected to become active. Further, it may be possible to set the interference margin to ($M_2/(N_{Active}+N_{InActive})$) and allocate the interference margin to all of the devices; however, in this case, the maximum acceptable transmission power of the active communication devices tends to be reduced and it may become necessary to reconstruct operation parameters of the communication devices, so that it is desirable to prevent the above-described situation from occurring as much as possible.

To cope with this, when a remainder interference margin occurs in the communication control device 1, it is possible to increase the interference margin of the communication control device 2 by accommodating the remainder interference margin to the communication control device 2. An example of accommodation of the remainder interference margin will be described. It is assumed that the remainder interference margin of the communication control device 1 is denoted by $M_{Remainder1}$. If an interference margin equivalent to the interference margin ($M_2/N_{Active}$) of the currently active communication devices is to be accommodated, an amount of a margin to be accommodated $M_{Accommodation}$ is represented as Expression (1) below.

$$M_{Accomodation} = N_{Inactive} \cdot \frac{M_2}{N_{Active}} \quad (1)$$

Therefore, the remainder interference margin of the communication control device 1 after accommodation is represented by Expression (2) below.

$$M'_{Remainder1} = M_{Remainder1} - M_{Accommodation} \quad (2)$$

However, the above expression is true only if $M_{Remainder1}$ is equal to or larger than $M_{Accommodation}$. If $M_{Remainder1}$ is smaller than $M_{Accommodation}$, $M_{Accommodation}$ is represented by Expression (3) below.

$$M_{Accommodation} = M_{Remainder1} \quad (3)$$

(Second Method)

Next, as a second method, a method will be described in which it is assumed that inactive communication device information are expected to become active and a total interference margin amount needed by the inactive communication devices are estimated. This method may be applied to the passive accommodation.

In this case, the communication control device estimates the total interference margin amount, and notifies the other communication control device of an estimated value as a desired interference margin amount. The other communication control device determines whether it is possible to provide the notified desired interference margin amount, and returns a response based on a determination result. If it is possible to provide the desired interference margin amount, the desired amount is accommodated from the remainder interference margin. Further, it may be possible to determine that the desired interference margin amount is not fully providable, but a part of the desired interference margin amount is providable, and it may be possible to accommodate the providable amount. Meanwhile, as a method of setting the desired interference margin amount, it may be possible to use the first method as described above.

(Third Method)

Next, as a third method, a method will be described in which when interferences caused by the active communication devices of the other communication control device exceeds the interference margin, a total interference margin amount that is needed to compensate for an excess amount is estimated. This method may be applied to the active accommodation. In particular, this method may be applied to a case in which, in a procedure of determining secondary use of a frequency, the communication device notifies the frequency management database of desired maximum transmission power and it is determined whether an estimated value of interference that may occur due to the desired maximum transmission power meets the interference margin.

In this case, the amount of the margin to be accommodated $M_{Accommodation}$ may be obtained by Expression (4) below.

$$M_{Accomodation} = \sum_{i \in I} (I_{Est,i} - M_i) \quad (4)$$

In Expression (4), I represents a set of communication devices for which an interference estimated value exceeds the interference margin, i represents indices of the communication devices, $I_{Est,I}$ represents the interference estimated value, and $M_i$ represents margins allocated to the communication devices i. If there is a remainder in a margin allocated to a communication device that is not included in the set I, it may be possible to perform compensation by using the remainder. In other words, a correction value may be included in a sum in Expression (4). Here, for the sake of simplicity, it is assumed that no remainder occurs in a margin allocated to a communication device that is not included in the set I.

Therefore, the remainder interference margin obtained after the communication control device 1 has performed the accommodation is represented by Expression (5) below.

$$M'_{Remainder1} = M_{Remainder1} - M_{Accommodation} \quad (5)$$

However, the above expression is true only if $M_{Remainder1}$ is equal to or larger than $M_{Accommodation}$. If $M_{Remainder1}$ is smaller than $M_{Accommodation}$, $M_{Accommodation}$ is represented by Expression (6) below.

$$M_{Accommodation} = M_{Remainder1} \quad (6)$$

(Fourth Method)

Next, as a fourth method, a method will be described in which interferences caused by the active communication devices exceeds the interference margin, a total interference margin amount that is needed to compensate for an excess amount is estimated. This method maybe applied to the passive accommodation.

In this method, the communication control device estimates the excess amount of the interference margin. Then, the communication control device notifies the other communication control device of an estimated value as a desired interference margin amount. The other communication control device determines whether it is possible to provide the notified desired interference margin amount, and returns a response based on a determination result. If it is possible to provide the desired interference margin amount, the desired amount is accommodated from the remainder interference margin. Further, it may be possible to determine that the desired interference margin amount is not fully providable, but a part of the desired interference margin amount is providable, and it may be possible to accommodate the providable amount. Meanwhile, as a method of setting the desired interference margin amount, it may be possible to use the third method as described above.

(Example in which Three or More Communication Control Devices are Present)

In the examples as described above, for simplicity of explanation, explanation has been given based on the assumption that the models in which the two communication control devices are present are adopted. However, in reality, it is naturally expected that three or more communication control devices are present. In this case, for example, if communication control devices 1, 2, and 3 are present, the communication control devices 1 and 2 (hereinafter, referred to as concerning parties) accommodate interference margins with each other, and accommodation information is not provided to the communication control device 3 (hereinafter, referred to as a third party), a procedure for allocating the interference margins after information exchange among the communication control devices, that is, a calculation of interferences to be given to a protection target radio system is influenced. This is because it is necessary to take into account aggregation of interferences (Interference Aggregation) due to the plurality of communication devices.

Therefore, in the following description, a case will be described in which accommodated interference margin information is provided from the concerning parties to the third party, and the third party utilizes the provided accommodated interference margin information.

FIG. 10 is a flow diagram illustrating an example of the remainder interference margin accommodation method according to the embodiment of the present disclosure. In FIG. 10, an example of operation performed by the three communication control devices 1, 2, and 3 is illustrated.

Each of the communication control devices exchanges information on communication devices managed by the subject device with the other communication control devices (Step S111). Then, the communication control devices 1 and 2 as the concerning parties perform the procedures of allocating interference margins (Steps S112 and S113). Further, after performing the procedures of allocating the interference margins, the communication control devices 1 and 2 as the concerning parties calculate amounts of remainder interference margins (Steps S114 and S115).

In this example, it is assumed that a remainder interference margin has occurred in the communication control device 1. The communication control device 1 determines an accommodatable amount in the remainder interference margin (Step S116). The communication control device 2, because interferences caused by active communication devices exceed the interference margin, transmits an interference margin accommodation request to the communication control device 1 (Step S117). The communication control device 1 accommodates the interference margin in response to the accommodation request from the communication control device 2 (Step S118).

Upon receiving the accommodated interference margin from the communication control device 1, the communication control device 2 notifies the communication control device 3 as the third party of information on the accommodated interference margin (Step S119). This is because if the accommodated interference margin information is not provided to the communication control device 3, the communication control device 3 is not able to accurately calculate an interference and perform the procedure of allocating the interference margin to communication devices controlled by the communication control device 3. Here, the information provided from the communication control device 2 to the communication control device 3 include information indicating the communication control device serving as an accommodation source, information on a protection target radio system to which the interference margin is applied, and information on the amount of the accommodated interference margin. The information on the protection target radio system to which the interference margin is applied include information (a position, an ID, or the like) indicating an interference calculation reference point, information on a target frequency, and the like.

Thereafter, the communication control device 2 applies the accommodated remainder interference margin and utilizes it for a calculation of the maximum acceptable transmission power of the communication devices controlled by the subject device (Step S120). Further, the communication control device 3 that has received the information on the interference margin that has been accommodated to the communication control device 2 by the communication control device 1 performs the procedure of allocating the interference margin to the communication devices controlled by the subject device on the basis of the received information (Step S121). If the communication control device 3 has completed calculations for allocation of the interference margin, the communication control device 3 may re-calculate an amount of an interference margin to be allocated on the basis of the received information. Further, to prevent the re-calculation of the amount of the interference margin to be allocated, if the above-described accommodation mode has not been set in advance, the communication control device 3 may set a wait time before performing the procedure of allocating the interference margin.

(Example of a Case in which Three or More Communication Control Devices are Present, and Interference Margins can be Accommodated from a Plurality of Communication Control Devices)

Next, a case will be described in which three or more communication control devices are present, and interference margins can be accommodated from a plurality of communication control devices. For example, it is assumed that the communication control device 1 requests accommodation of an interference margin and both of the communication control devices 2 and 3 are able to accommodate interference margins. In this case, the communication control device 1 can select any of options as described below To Receive Accommodation from a Single Communication Control Device For example, this option may be selected when a bidding system for accommodation is adopted. For example, if the communication control device 1 gives a notice of an accommodation request, the communication control devices that have received the notice may provide, as responses, costs needed for the accommodation. With this configuration, the communication control device 1 is able to select a communication control device that serves as an accommodation source, on the basis of an accommodation cost. This method may be applied simply when only a single communication control device is present that is able to provide a desired accommodation amount.

To Receive Accommodation from Two or More Communication Control Devices

In this case, for example, it may be possible to receive accommodation of interference margins from a plurality of communication control devices such that a cumulative value reaches a desired interference margin amount. In this case, the accommodation request may include a desired interference margin amount (an amount desired to be received from a single communication control device). With this configuration, the communication control device that has requested accommodation of an interference margin is able to receive a necessary amount of accommodation from each of the communication control devices.

(Compensation and Limitation with Respect to Accommodation)

When accommodating an interference margin, a communication control device serving as an accommodation source may receive compensation for accommodation. For example, an accommodation cost may be paid. Alternatively, for example, if the communication control device 1 that has served as the accommodation source at a time t needs to receive accommodation of an interference margin from other communication control devices after the time t, the communication control device 1 may preferentially receive accommodation from the communication control device 2 for which the communication control device 1 has performed the accommodation at the time t.

Further, it may be possible to impose limitations on the accommodation of the interference margin. For example, the following limitations may be imposed.

For example, it may be possible to impose a limitation such that accommodation is not successively performed x or more times (x is an arbitrary positive integer) from the same communication control device. Further, it may be possible to impose a limitation such that a certain amount of accommodation that exceeds the remainder interference margin is not performed. Furthermore, it may be possible to set a period in which the accommodation is enabled and a period in which the accommodation is disabled.

As for the accommodation of the interference margin, it may be possible to utilize a blockchain technique and check whether fraudulent accommodation is not performed, for example. Specifically, a plurality of communication control devices may record accommodation histories and utilize the histories as ledgers, and each of the communication control devices may check whether fraudulent accommodation is performed.

(Switch Between Accommodation Modes)

As described above, a plurality of interference margin accommodation modes may be assumed as described above, and, in this case, a communication control device may switch between the accommodation modes on the basis of a predetermined trigger. Situations that may become triggers to switch between the accommodation modes will be described below.

For example, the communication control device may switch the accommodation mode after performing a calculation of an interference amount, which is performed regularly or irregularly. For example, it may be possible to switch to an active accommodation mode if the amount of the remainder interference margin is equal to or larger than a predetermined amount after the calculation of the interference amount has been performed, and switch to an inactive accommodation mode in other cases. This is because the amount of the remainder interference margin may be changed after the calculation of the interference.

For another example, the communication control device may switch the accommodation mode after exchanging information on communication devices, which is performed regularly or irregularly among the communication control devices. For example, it may be possible to switch to the active accommodation mode if the amount of the remainder interference margin is equal to or larger than a predetermined amount after the exchange of the information has been performed, and switch to the inactive accommodation mode in other cases. This is because the amount of the remainder interference margin may be changed after the exchange of the information.

For still another example, the communication control device may switch the accommodation mode after a frequency use condition of the primary system is changed. This is because the amount of the interference margin allocated to the communication control device may be changed.

For still another example, the communication control device may switch the accommodation mode after switching a control algorithm related to interference control (Network coexistence) among the communication devices. This is because if the control algorithm is changed, the amount of the remainder interference margin may be changed in accordance with this change.

In the present embodiment, the explanation has been given using terms of the communication control devices and the radio systems, but embodiments of the present disclosure are not limited thereto.

For example, the technology is not limited to a frequency band in which the frequency sharing is performed, and, in this case, a network manager may include the functions of the communication control device of the present embodiment. The network manager may be a Centralized Baseband Unit (BBU) with a network configuration called Centralized RAN, or may be a device that includes the centralized BBU. Further, a radio base station or an access point may include functions of the network manager of the present embodiment. In this case, the technology may be applied by replacing the radio systems described in the present embodiment with "terminals".

Furthermore, in general, in the frequency sharing, an existing system that uses a target band is referred to as the primary system, and a secondary user is referred to as the secondary system, but in embodiments of the present disclosure, they are replaced with other terms. For example, it may be possible to adopt a microcell in a heterogeneous network (HetNet) as the primary system, and adopt a small cell and a relay station as the secondary systems. Moreover, it may be possible to adopt a base station as the primary system, and a relay UE and a vehicle UE that realize D2D or V2X present in the coverage as the secondary systems. The base station is not limited to a fixed type, but may be a portable type or a mobile type.

Furthermore, the term "frequency" used in the present embodiment may be replaced with other terms. For example, the term may be replaced with a term indicating a frequency block, such as a "frequency channel", a "resource block", or a "component carrier".

1.3. Configuration Example

Figure 11:
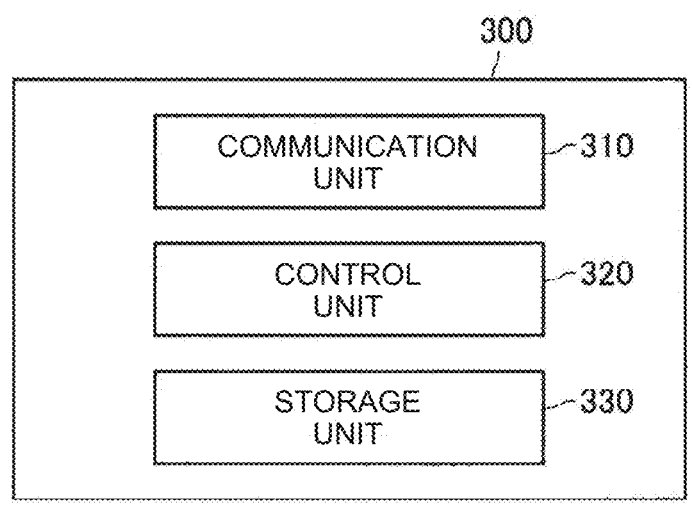
FIG. 11 is an explanatory diagram illustrating a functional configuration example of a communication control device 300 according to the embodiment of the present disclosure.

A functional configuration example of the communication control device according to the embodiment of the present disclosure will be described below. FIG. 11 is an explanatory diagram illustrating a functional configuration example of a communication control device 300 according to the embodiment of the present disclosure. In the following, the functional configuration example of the communication control device 300 according to the embodiment of the present disclosure will be described with reference to FIG. 11.

As illustrated in FIG. 11, the communication control device 300 according to the embodiment of the present disclosure includes a communication unit 310, a control unit 320, and a storage unit 330.

The communication unit 310 performs communication with other devices under the control of the control unit 320. In the present embodiment, the communication unit 310 transmits information for performing control on a radio device 100 managed by the subject device, or transmits and receives information on the managed radio device to and from other communication control devices.

The control unit 320 controls operation of the communication control device 300. Specifically, the control unit 320 calculates various margins as described above and performs a process of accommodating the remainder interference margin, on the basis of information managed by the subject device or information acquired by the communication unit 310. The control unit 320 may be constructed by, for example, a processor, such as a central processing unit (CPU), or a storage device, such as a read only memory (ROM) or a random access memory (RAM).

The storage unit 330 stores therein information, programs, and the like for operation of the communication control device 300. The storage unit 330 stores therein, for example, the frequency management database as described above. The frequency management database stored in the storage unit 330 is updated by the control unit 320. Meanwhile, the storage unit 330 may be constructed by, for example, various recording devices, such as a hard disk drive (HDD). Meanwhile, the frequency management database as described above may be stored in a device different from the communication control device 300. In this case, the communication control device 300 performs update of the frequency management database stored in the different device and reference to the frequency management database.

2. Conclusion

As described above, according to the embodiment of the present disclosure, it is possible to provide a communication control device that is able to accommodate an interference margin to other communication control devices when an interference margin to be allocated to communication devices remains and a remainder interference margin occurs. Furthermore, according to the embodiment of the present disclosure, it is possible to provide a communication control device that is able to receive accommodation of an interference margin from other communication control devices when an interference margin to be allocated to the communication devices are run out.

Each of Steps in the processes performed by the devices in the present specification need not always be processed in chronological order as illustrated in the flowchart. For example, each of Steps related to the processes performed by the devices may be executed in different order from the order illustrated in the flowchart, or may be performed in a parallel manner.

Furthermore, it is possible to generate a computer program that causes hardware, such as a CPU, a ROM, and a ROM, incorporated in each of the devices to implement the same functions as those of the devices as described above. Moreover, it is possible to provide a storage medium in which the computer program is stored. Furthermore, it is possible to implement a series of processes by hardware by constructing each of the functional blocks illustrated in the functional block diagram by hardware.

While the preferred embodiment of the present disclosure has been described in detail above with reference to the accompanying drawings, the technical scope of the present disclosure is not limited to the examples as described above. It is obvious that a person skilled in the technical field of the present disclosure may conceive various alternations and modifications within the scope of the technical idea described in the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

In addition, the following configurations are also within the technical scope of the present disclosure.

(1)

A communication control device comprising:
a control unit configured to set an acceptable interference amount that is acceptable for a secondary system with respect to a primary system, the secondary system secondary using a radio wave in a predetermined frequency band allocated to the primary system, wherein
the control unit accommodates at least a part of a second margin to a different communication control device on the basis of information on a desired interference acceptable amount received from the different communication control device, the second margin being generated at the time of setting the acceptable interference amount and obtained by subtracting a first margin that is allocated to a secondary system managed by the subject device from a total interference margin that is set in the subject device.

(2)

The communication control device according to (1), wherein the information on the desired interference acceptable amount is set based on an excess amount of an interference amount that may be given to the primary system by a secondary system managed by the different communication control device, with respect to a total interference margin that is set for the different communication control device.

(3)

The communication control device according to (1) or (2), wherein the control unit operates in one of a first mode and a second mode, the first mode being a mode in which accommodation of at least a part of the second margin is offered without receiving a request from the different communication control device, the second mode being a mode in which at least a part of the second margin is accommodated based on a request from the different communication control device.

(4)

The communication control device according to (3), wherein the control unit switches between the first mode and the second mode on the basis of a predetermined condition.

(5)

The communication control device according to (4), wherein the control unit switches between the first mode and the second mode on the basis of a predetermined condition after a calculation of an interference amount is performed.

(6)

The communication control device according to (4), wherein the control unit switches between the first mode and the second mode on the basis of a predetermined condition after information on the secondary system is exchanged with the different communication control device.

(7)

The communication control device according to (4), wherein the control unit switches between the first mode and the second mode on the basis of a predetermined condition after a use condition of the primary system is changed.

(8)

The communication control device according to (4), wherein the control unit switches between the first mode and the second mode on the basis of a predetermined condition after an algorithm related to interference control among other communication control devices is changed.

(9)

The communication control device according to any one of (1) to (8), wherein the control unit offers accommodation of a margin to a different communication control device if the first margin to be allocated to the secondary system managed by the subject device is larger than the total interference margin.

(10)

The communication control device according to (9), wherein the control unit receives accommodation of margins from a plurality of different communication devices if the plurality of communication control devices offer accommodation of the margins and a cumulative value of the accommodated margins reaches a desired amount.

(11)

A communication control method implemented by a processor, the communication control method comprising:

setting an acceptable interference amount that is acceptable for a secondary system with respect to a primary system, the secondary system using a radio wave in a predetermined frequency band allocated to the primary system; and accommodating at least a part of a second margin to a different communication control device on the basis of information on a desired interference acceptable amount received from the different communication control device, the second margin being generated at the time of setting the acceptable interference amount and obtained by subtracting a first margin that is allocated to a secondary system managed by the subject device from a total interference margin that is set for the subject device.

(12)

A computer program that causes a computer to execute:

setting an acceptable interference amount that is acceptable for a secondary system with respect to a primary system, the secondary system using a radio wave in a predetermined frequency band allocated to the primary system; and accommodating at least a part of a second margin to a different communication control device on the basis of information on a desired interference acceptable amount received from the different communication control device, the second margin being generated at the time of setting the acceptable interference amount and obtained by subtracting a first margin that is allocated to a secondary system managed by the subject device from a total interference margin that is set for the subject device.

REFERENCE SIGNS LIST 100a radio device
100b radio device
100c radio device
100d radio device
100e radio device
200a terminal
200b terminal
200c terminal
200d terminal
300a communication control device
300b communication control device

The invention claimed is:

1. A communication control device comprising:
a processor and a non-transitory computer readable memory, the processor upon executing computer code stored in the non-transitory computer readable memory is configured to:
set an acceptable interference amount that is acceptable for a secondary system with respect to a primary system, the secondary system secondary using a radio wave in a predetermined frequency band allocated to the primary system, wherein
the processor accommodates at least a part of a second margin to a different communication control device on the basis of information on a desired interference acceptable amount received from the different communication control device, the second margin being generated at the time of setting the acceptable interference amount and obtained by subtracting a first margin that is allocated to a secondary system managed by the subject device from a total interference margin that is set in the subject device.

2. The communication control device according to claim 1, wherein the information on the desired interference acceptable amount is set based on an excess amount of an interference amount that may be given to the primary system by a secondary system managed by the different communication control device, with respect to a total interference margin that is set for the different communication control device.

3. The communication control device according to claim 1, wherein the processor is configured to operate in one of a first mode and a second mode, the first mode being a mode in which accommodation of at least a part of the second margin is offered without receiving a request from the different communication control device, the second mode being a mode in which at least a part of the second margin is accommodated based on a request from the different communication control device.

4. The communication control device according to claim 3, wherein the processor is configured to switch between the first mode and the second mode on the basis of a predetermined condition.

5. The communication control device according to claim 4, wherein the processor is configured to switch between the first mode and the second mode on the basis of a predetermined condition after a calculation of an interference amount is performed.

6. The communication control device according to claim 4, wherein the processor is configured to switch between the first mode and the second mode on the basis of a predetermined condition after information on the secondary system is exchanged with the different communication control device.

7. The communication control device according to claim 4, wherein the processor is configured to switch between the first mode and the second mode on the basis of a predetermined condition after a use condition of the primary system is changed.

8. The communication control device according to claim 4, wherein the processor is configured to switch between the first mode and the second mode on the basis of a predetermined condition after an algorithm related to interference control among other communication control devices is changed.

9. The communication control device according to claim 1, wherein the processor is configured to offer accommodation of a margin to a different communication control device if the first margin to be allocated to the secondary system managed by the subject device is larger than the total interference margin.

10. The communication control device according to claim 9, wherein the processor is configured to receive accommodation of margins from a plurality of different communication devices if the plurality of communication control devices offer accommodation of the margins and a cumulative value of the accommodated margins reaches a desired amount.

11. A communication control method implemented by a processor, the communication control method comprising:
   setting an acceptable interference amount that is acceptable for a secondary system with respect to a primary system, the secondary system using a radio wave in a predetermined frequency band allocated to the primary system; and
   accommodating at least a part of a second margin to a different communication control device on the basis of information on a desired interference acceptable amount received from the different communication control device, the second margin being generated at the time of setting the acceptable interference amount and obtained by subtracting a first margin that is allocated to a secondary system managed by the subject device from a total interference margin that is set for the subject device.

12. A non-transitory computer readable memory of a communication control device that holds a computer program and execution of the computer program by a processor causes the communication control device to perform:
   setting an acceptable interference amount that is acceptable for a secondary system with respect to a primary system, the secondary system using a radio wave in a predetermined frequency band allocated to the primary system; and
   accommodating at least a part of a second margin to a different communication control device on the basis of information on a desired interference acceptable amount received from the different communication control device, the second margin being generated at the time of setting the acceptable interference amount and obtained by subtracting a first margin that is allocated to a secondary system managed by the subject device from a total interference margin that is set for the subject device.

* * * * *